(12) United States Patent
Lu et al.

(10) Patent No.: US 10,344,459 B2
(45) Date of Patent: Jul. 9, 2019

(54) FAUCET MOUNTING MECHANISM

(71) Applicant: Xiamen Easo Co., Ltd., Xiamen, Fujian (CN)

(72) Inventors: Haitao Lu, Xiamen (CN); Zhen Li, Xiamen (CN); Ximin Chen, Xiamen (CN)

(73) Assignee: XIAMEN EASO CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/821,761

(22) Filed: Nov. 23, 2017

(65) Prior Publication Data

US 2019/0153707 A1    May 23, 2019

(51) Int. Cl.
*E03C 1/04*    (2006.01)
*F16L 37/12*   (2006.01)

(52) U.S. Cl.
CPC .......... *E03C 1/0401* (2013.01); *E03C 1/0402* (2013.01); *E03C 1/0403* (2013.01); *F16L 37/1215* (2013.01)

(58) Field of Classification Search
USPC .......................................................... 285/34
See application file for complete search history.

(56) References Cited

U.S. PATENT DOCUMENTS

2010/0032943 A1 *  2/2010  Li ...................... F16L 37/0985
                                                     285/122.1

FOREIGN PATENT DOCUMENTS

CA         2749874 A1 *  2/2013  ........... E03C 1/0404

OTHER PUBLICATIONS

CA 2749874 A1, Canada, Tan, 2013, east.*

* cited by examiner

*Primary Examiner* — Robert K Arundale
*Assistant Examiner* — Daphne M Barry
(74) *Attorney, Agent, or Firm* — Chun-Ming Shih (57) ABSTRACT

A faucet mounting mechanism includes a faucet body, a pipe joint, a nut, and a fastening seat. A bottom of an inner ring of the nut has a first inclined surface. The fastening seat is mated with the nut. The fastening seat has a second inclined surface. An outer ring of the fastening seat is provided with at least two fastening buckles. The fastening buckles are tightly mated with an inner wall of the nut. Through the cooperation of the nut and the fastening seat, the nut and the pipe joint can be assembled or disassembled quickly.

7 Claims, 8 Drawing Sheets

FAUCET MOUNTING MECHANISM

BACKGROUND OF THE INVENTION

1. Field of the Invention

The present invention relates to a faucet mounting mechanism, and more particularly to a faucet mounting mechanism for mounting and dismounting a faucet quickly.

2. Description of the Prior Art

A kitchen faucet or a basin faucet is installed at a position close to the wall. Due to the shape of the kitchen stainless steel sink and the basin body, the space under the countertop for locking the faucet is limited. According to the traditional operation to lock the nut on the bolt, the nut is rotated from the lower end of the bolt. The effective length of the bolt depends on the thickness of the countertop, which determines the length of the nut to be locked. Thus, to lock or unlock the nut takes time and energy. It is not easy to install the faucet.

Accordingly, the inventor of the present invention has devoted himself based on his many years of practical experiences to solve these problems.

SUMMARY OF THE INVENTION

The primary object of the present invention is to provide a faucet mounting mechanism for mounting and dismounting a faucet quickly.

In order to achieve the aforesaid object, the faucet mounting mechanism of the present invention comprises a faucet body, a pipe joint, a nut, and a fastening seat. An upper part of the pipe joint is connected to the faucet body. A lower part of the pipe joint has an outer thread. The nut has an inner ring which is greater than an outer diameter of the pipe joint and has an inner thread. The inner ring has at least one opening passing through two ends thereof. A bottom of the inner ring has a first inclined surface. The fastening seat is mated with the nut. The fastening seat has a second inclined surface for pressing the first inclined surface of the nut inwardly. An outer ring of the fastening seat is provided with at least two fastening buckles. The fastening buckles are tightly mated with an inner wall of the nut.

Preferably, the inner wall of the nut is provided with two engaging troughs corresponding to and mated with the fastening buckles of the fastening seat.

Preferably, the nut has the annular inner ring, an annular outer ring, and a connecting plate connected between the inner ring and the outer ring. The fastening seat is fitted between an inner wall of the outer ring and an outer wall of the inner ring of the nut.

Preferably, the at least one opening includes a plurality of openings which are equally spaced. The openings divide the inner ring into a plurality of teeth.

Preferably, the fastening seat is provided with at least two elastic engaging buckles. The engaging buckles extend outwardly from an outer wall of the fastening seat to be in the form of a barb. The nut is provided with chutes corresponding to the engaging buckles for the engaging buckles to slide up and down in the corresponding chutes.

Preferably, a notch passing through a bottom of the fastening seat is formed between two sides of each fastening buckle and the fastening seat. An outer side of each fastening buckle has a protrusion. One end of the protrusion, adjacent to the nut, has a third inclined surface.

Preferably, the fastening seat is recessed to form a retaining wall corresponding in position to each fastening buckle. A gap is formed between the retaining wall and the corresponding fastening buckle.

Preferably, a bottom end of each fastening buckle extends beyond a bottom end of the fastening seat. The retaining wall is flush with the bottom end of the corresponding fastening buckle.

Preferably, a bottom of the faucet body is connected to the pipe joint by means of threads or snap-fit.

In the faucet mounting mechanism of the present invention, through the cooperation of the nut and the fastening seat, the nut and the pipe joint can be assembled or disassembled quickly. When installed, the faucet body is connected to the pipe joint, and the pipe joint is installed in a mounting hole of a mounting countertop, and then the nut and the fastening seat are fitted on the pipe joint under the countertop. After the fastening buckles of the fastening seat and the inner wall of the nut form a tight fit, the first inclined surface of the nut is pressed by the second inclined surface of the fastening seat by pushing up the fastening seat. Because the inner ring of the nut has the openings, the openings are compressed to reduce the inner diameter of the inner ring when the first inclined surface is pressed by the second inclined surface. When the inner diameter of the inner ring is reduced to mate with the outer thread of the pipe joint, the inner thread of the inner ring is engaged with the outer thread of the pipe joint so that the nut and the pipe joint are retained, and then the nut and the pipe joint can be tightened by rotating the nut. When disassembled, the fastening buckles are pressed and the fastening seat is pulled down, such that the second inclined surface of the fastening seat is separated from the first inclined surface of the nut. The openings are restored so that the inner diameter of the inner ring of the nut is greater than the outer diameter of the pipe joint. The nut and the fastening seat can be easily removed. The invention can realize the quick disassembly and assembly under the countertop by a simple structure.

DETAILED DESCRIPTION OF THE PREFERRED EMBODIMENTS

Figure 1:
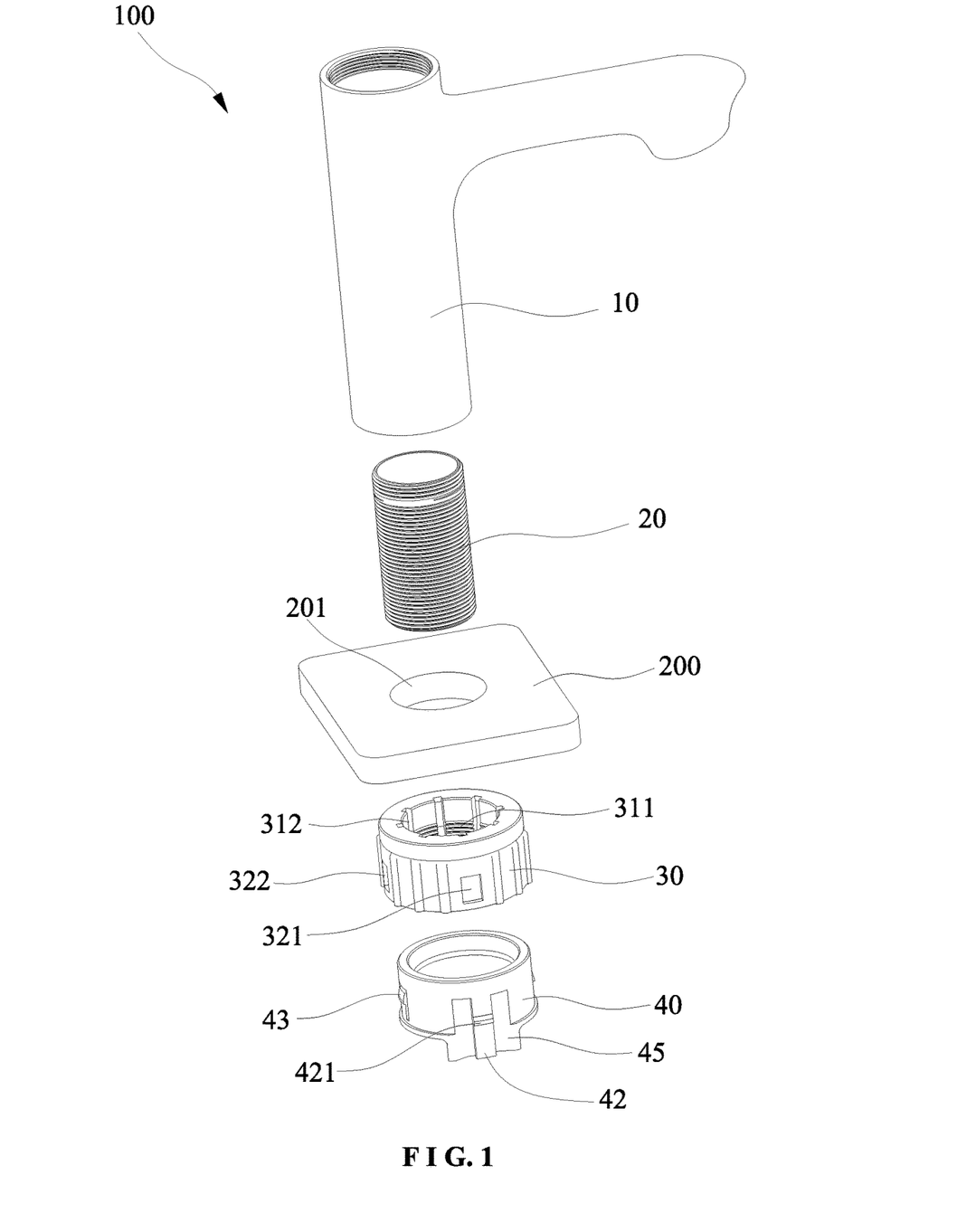
FIG. 1 is an exploded view in accordance with a preferred embodiment of the present invention.
Figure 2:
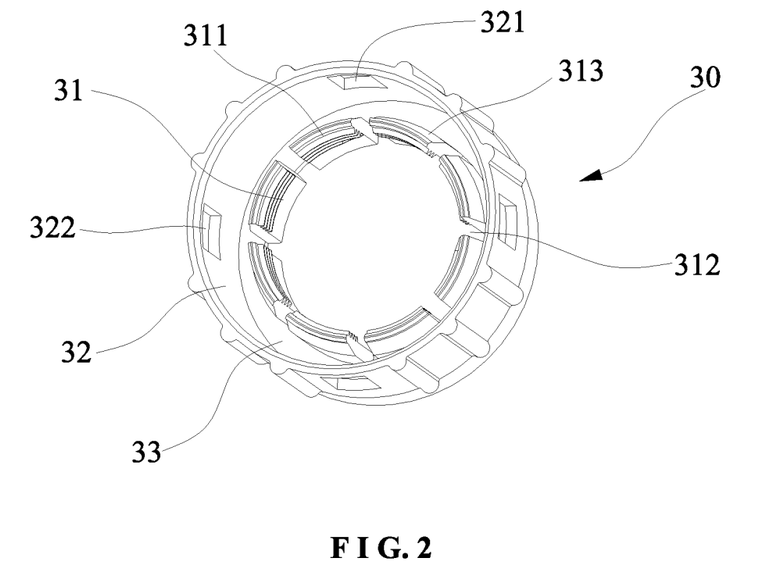
FIG. 2 is a perspective view of the nut in accordance with the preferred embodiment of the present invention.
Figure 3:
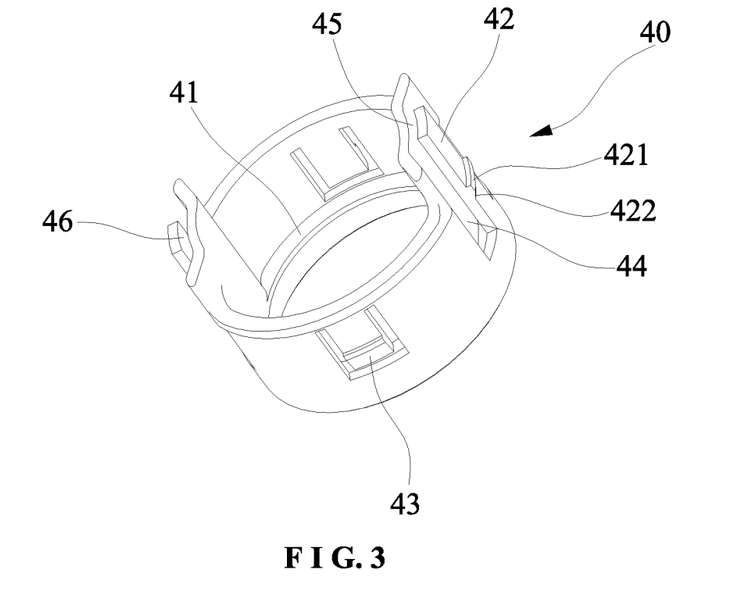
FIG. 3 is a perspective view of the fastening seat in accordance with the preferred embodiment of the present invention.
Figure 4:
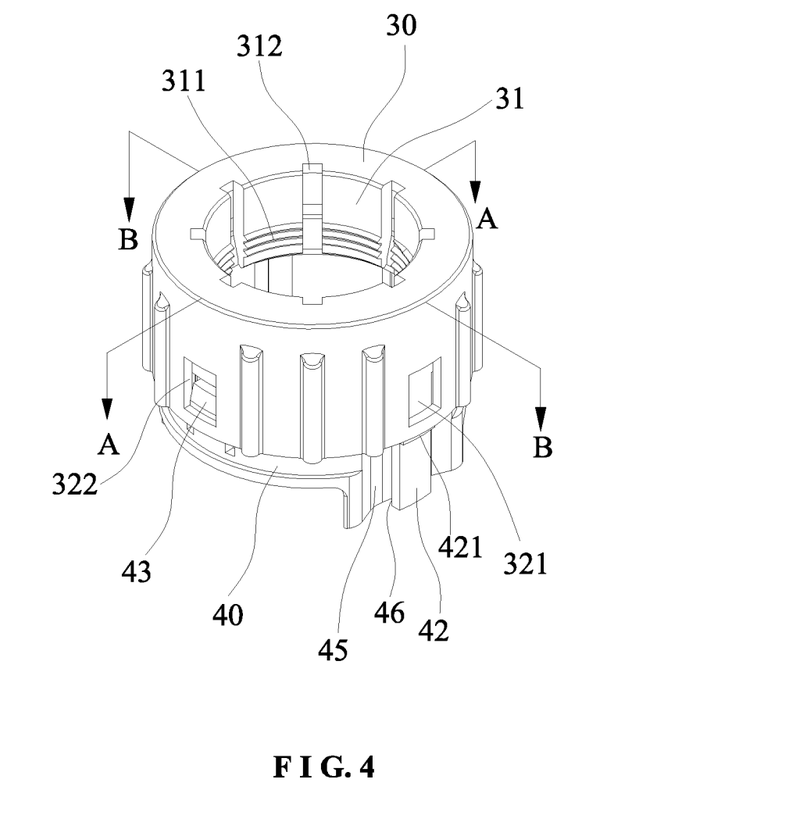
FIG. 4 is a perspective view showing the assembly of the nut and the fastening seat in accordance with the preferred embodiment of the present invention.
Figure 5:
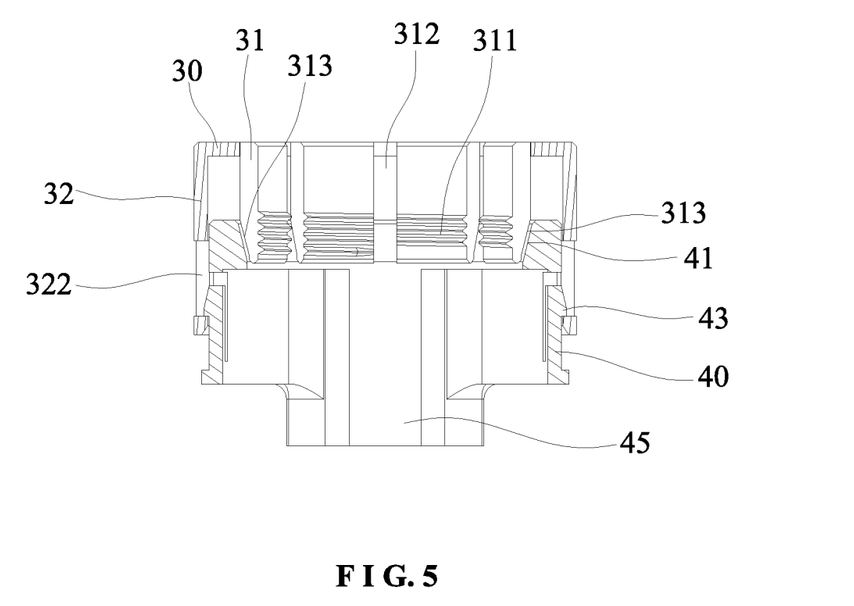
FIG. 5 is a sectional view taken along line A-A of FIG. 4.
Figure 6:
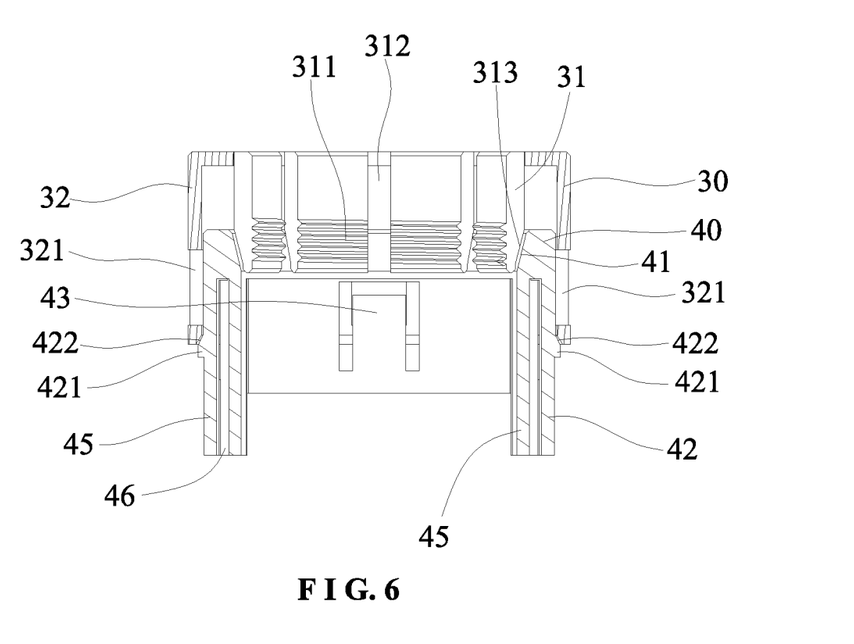
FIG. 6 is a sectional view taken along line B-B of FIG. 4.
Figure 7:
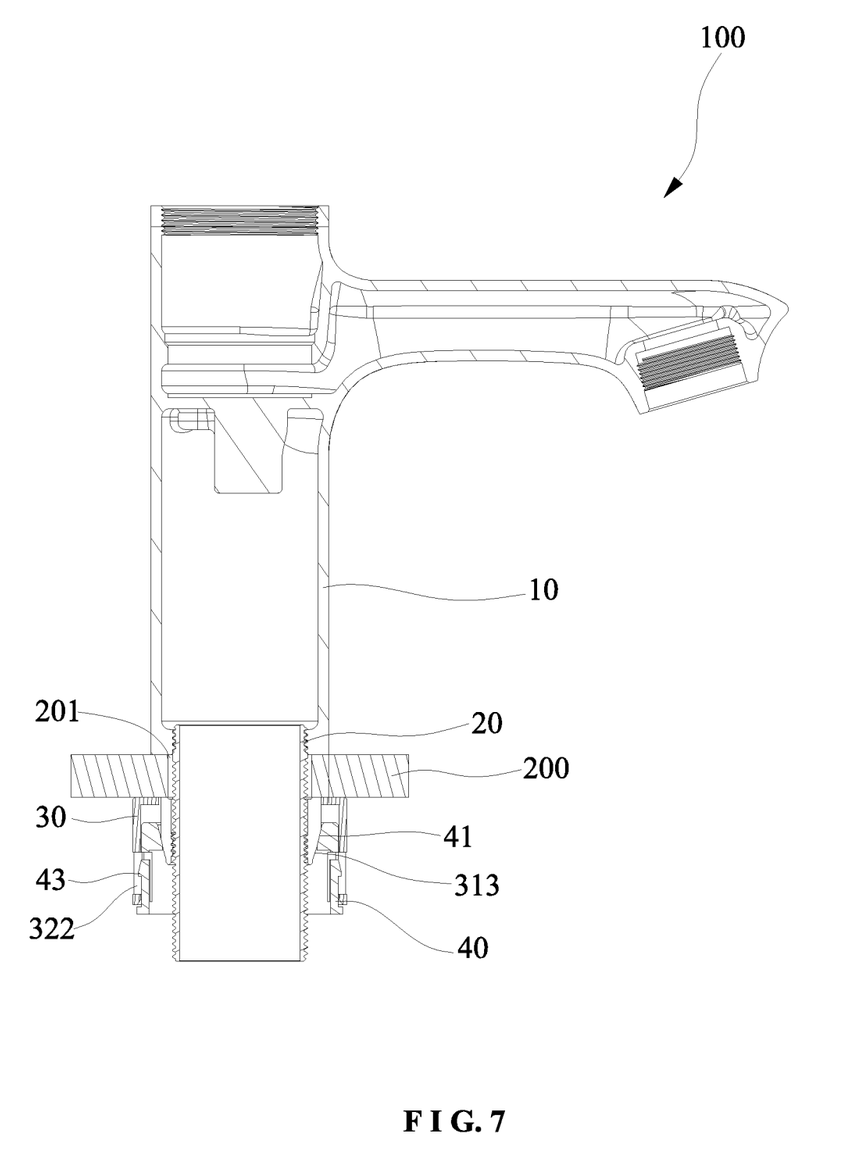
FIG. 7 is a sectional view of the present invention after installed.
Figure 8:
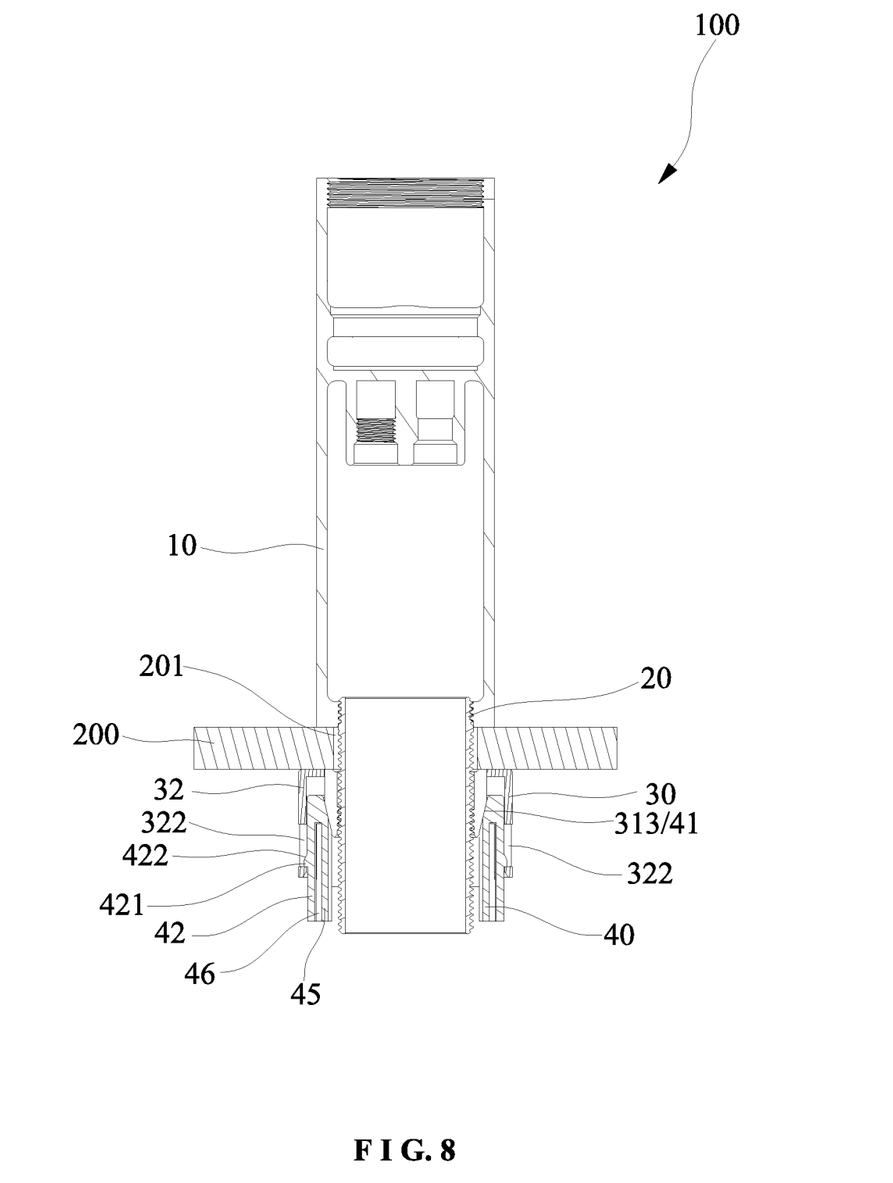
FIG. 8 is another sectional view of the present invention after installed.
Figure 9:
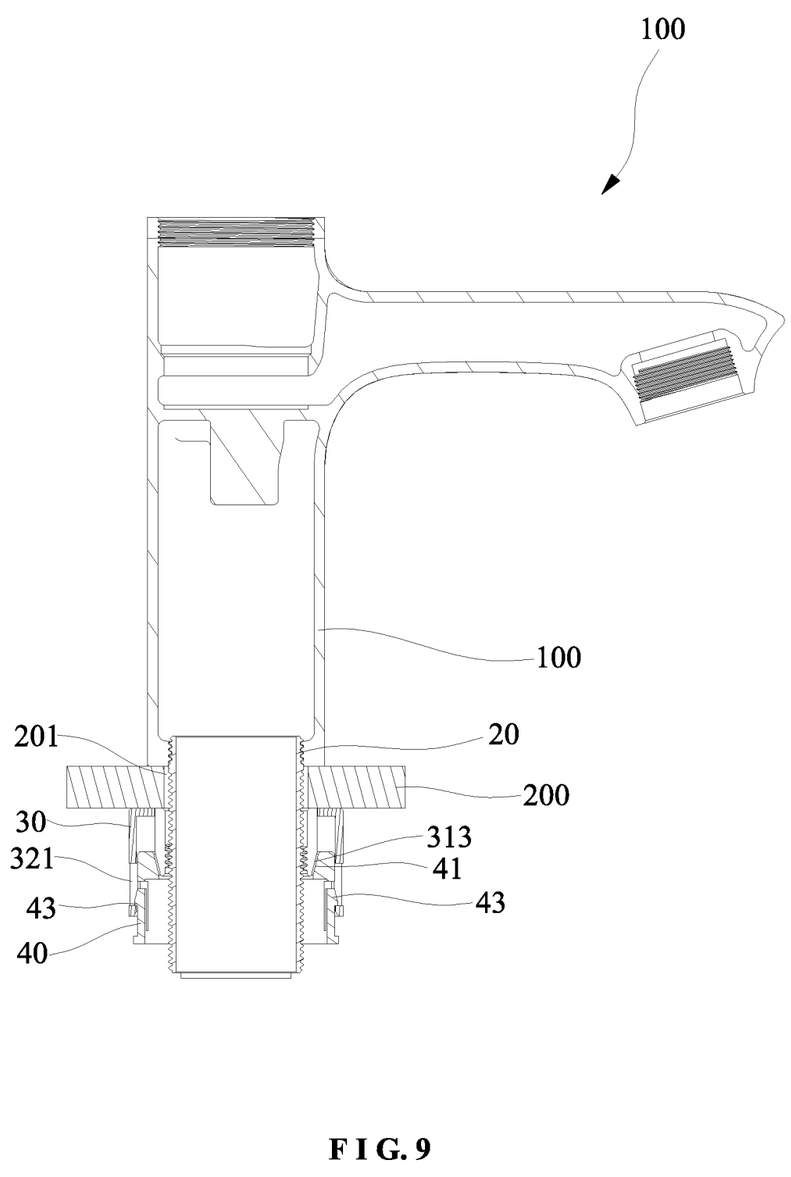
FIG. 9 is a sectional view of the quick-release state of the present invention.
Figure 10:
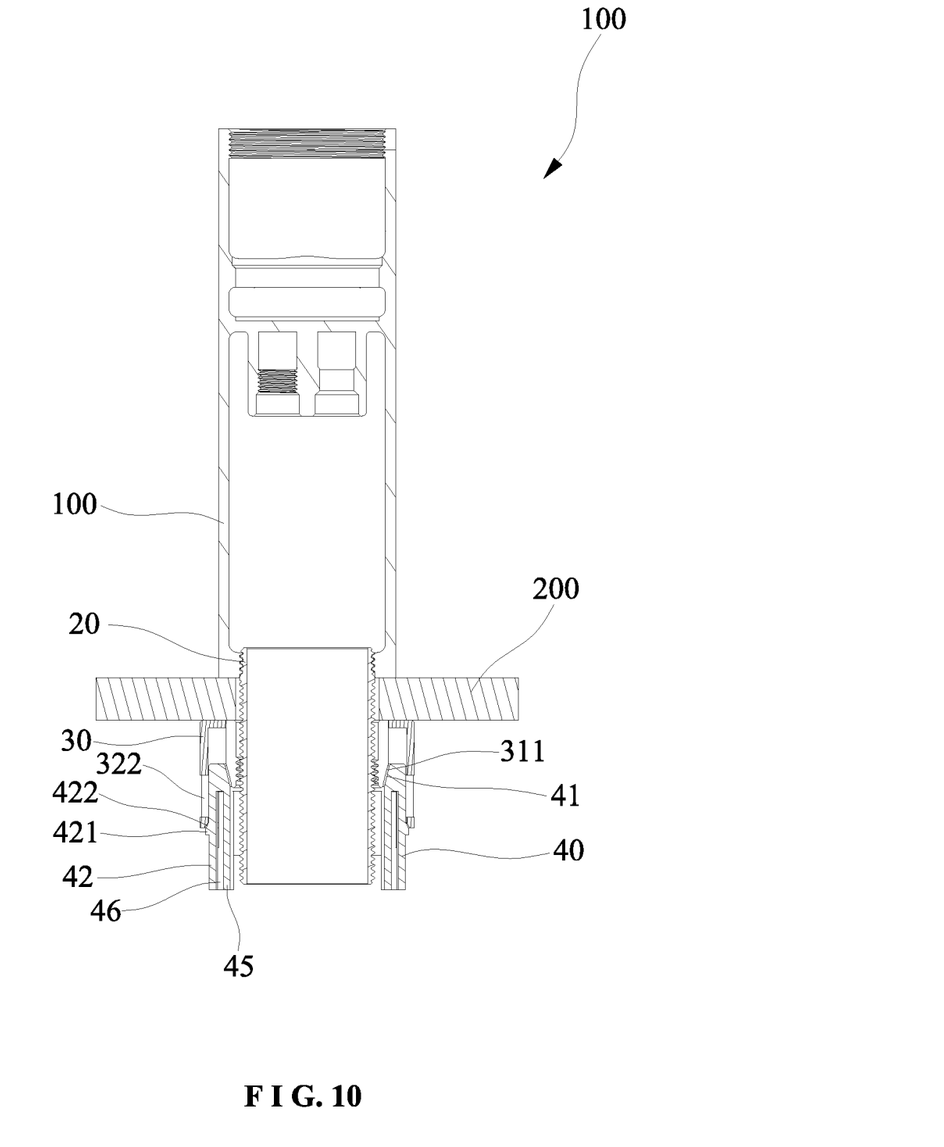
FIG. 10 is another sectional view of the quick-release state of the present invention.

Embodiments of the present invention will now be described, by way of example only, with reference to the accompanying drawings. Referring to FIG. 1 to FIG. 10, the present invention discloses a faucet mounting mechanism 100. The faucet mounting mechanism 100 comprises a faucet body 10, a pipe joint 20, a nut 30, and a fastening seat 40.

The pipe joint 20 is mated with a mounting hole 201 of a mounting countertop 200. An upper part of the pipe joint 20 is connected and fixed to the faucet body 10. A lower part of the pipe joint 20 is inserted into the mounting hole 201 of the mounting countertop 200. The connection between the pipe joint 20 and the faucet body 10 may be achieved in various ways. For example, as shown in the drawings, the inner wall of the lower end of the faucet body 10 is formed with an inner thread. The outer wall of the pipe joint 20 is formed with an outer thread. Through the inner and outer threads, the pipe joint 20 and the faucet body 10 are connected together. The faucet body 10 and the pipe joint 20 may be connected by welding, or the faucet body 10 and the pipe joint 20 may be connected through a snap-fit structure and the like.

The nut 30 has an annular inner ring 31 which is greater than an outer diameter of the pipe joint 20 and has an inner thread 311. The inner ring 31 has at least one opening 312 passing through two ends thereof. As shown in the drawings, the inner ring 31 has a plurality of openings 312 which are equally spaced. The openings 312 divide the inner ring 31 into a plurality of teeth. The bottom of the inner ring 31 has a first inclined surface 313. The nut 30 further has an annular outer ring 32 and a connecting plate 33 connected between the inner ring 31 and the outer ring 32. The fastening seat 40 is fitted between the inner wall of the outer ring 32 and the outer wall of the inner ring 31 of the nut 30. The fastening seat 40 has a second inclined surface 41 for pressing the first inclined surface 313 of the nut 30 inwardly. An outer ring of the fastening seat 40 is provided with at least two fastening buckles 42. The fastening buckles 41 are tightly mated with the inner wall of the nut 30. Preferably, the inner wall of the outer ring 32 of the nut 30 is provided with at least two engaging troughs 321 corresponding to and mated with the fastening buckles 42 of the fastening seat 40.

Through the cooperation of the nut 30 and the fastening seat 40, the nut 30 and the pipe joint 20 can be assembled or disassembled quickly. When installed, the faucet body 10 is connected to the pipe joint 20, and the pipe joint 20 is installed in the mounting hole 201 of the mounting countertop 200, and then the nut 30 and the fastening seat 40 are fitted on the pipe joint 20 under the countertop 200. After the fastening buckles 42 of the fastening seat 40 and the inner wall of the nut 30 form a tight fit, the first inclined surface 313 of the nut 30 is pressed by the second inclined surface 41 of the fastening seat 40 by pushing up the fastening seat 40. Because the inner ring 31 of the nut 30 has the openings 312, the openings 312 are compressed to reduce the inner diameter of the inner ring 31 when the first inclined surface 313 is pressed by the second inclined surface 41. When the inner diameter of the inner ring 31 is reduced to mate with the outer thread of the pipe joint 20, the inner thread 311 of the inner ring 31 is engaged with the outer thread of the pipe joint 20 so that the nut 30 and the pipe joint 20 are retained, and then the nut 30 and the pipe joint 20 can be tightened by rotating the nut 30. When disassembled, the fastening buckles 42 are pressed and the fastening seat 40 is pulled down, such that the second inclined surface 41 of the fastening seat 40 is separated from the first inclined surface 313 of the nut 30. The openings 312 are restored so that the inner diameter of the inner ring 31 of the nut 30 is greater than the outer diameter of the pipe joint 20. The nut 30 and the fastening seat 40 can be easily removed. The invention can realize a quick disassembly and assembly under the countertop by a simple structure.

Preferably, for the nut 30 and the fastening seat 40 to be connected with the pipe joint 20 under the countertop with ease, the outer periphery of the fastening seat 40 is provided with at least two elastic engaging buckles 43. The engaging buckles 43 extend outwardly from the outer wall of the fastening seat 40 to be in the form of a barb. The inner wall of the outer ring 32 of the nut 30 is provided with chutes 322 corresponding to the engaging buckles 43 for the engaging buckles 43 to slide up and down in the corresponding chutes 43. Before the nut 30 and the fastening seat 40 are connected with the pipe joint 20, the fastening seat 40 can be combined with the nut 30 through the engagement of the engaging buckle 43 and the chutes 322, thereby facilitating operation.

Preferably, a notch 44 passing through the bottom of the fastening seat 40 is formed between two sides of each fastening buckle 42 and the fastening seat 40 so that the fastening buckle 42 has elasticity. The outer side of each fastening buckle 42 has a protrusion 421. The protrusion 421 cooperates with the engaging trough 321 of the nut 30. One end of the protrusion 421, connected with the nut 30, has a third inclined surface 422, which facilitates the protrusion 421 to be engaged in the engaging trough 321 so that the nut 30 and the fastening seat 40 are connected together.

Preferably, the fastening seat 40 is recessed to form a retaining wall 45 corresponding in position to each fastening buckle 42. A gap 46 is formed between the retaining wall 45 and the corresponding fastening buckle 42, so that the fastening buckle 42 has elasticity relative to the fastening seat 40. The bottom end of each fastening buckle 42 extends beyond the bottom end of the fastening seat 40. The retaining wall 45 is flush with the bottom end of the corresponding fastening buckle 42. When disassembled, the fastening buckle 42 can be pressed conveniently, and the retaining wall 45 can protect the fastening buckle 42 and prevent the fastening buckle 42 from being broken by an excessive force.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A faucet mounting mechanism, comprising a faucet body, a pipe joint, a nut and a fastening seat, the pipe joint having a longitudinal axis and an upper part with respect to the longitudinal axis, the upper part of the pipe joint being connected to the faucet body, the pipe joint having a radial outer surface having an outer thread, the nut having a radial axis and an annular inner ring and an annular outer ring along the radial axis of the nut, the nut further having a connecting plate connected between the annular inner ring and the annular outer ring, the annular inner ring being greater than an outer diameter of the pipe joint and having an inner thread, the annular inner ring having a longitudinal axis and an upper and lower ends along the longitudinal axis of the annular inner ring, the annular inner ring having at least one opening passing through the upper and lower ends of the annular inner ring, the lower end of the annular inner ring having a first inclined surface, the annular outer ring of the nut having two engaging troughs, the fastening seat being fitted between the annular outer ring and the annular inner ring of the nut, the fastening seat having a second inclined surface for pressing the first inclined surface of the nut inwardly, an outer side of the fastening seat being provided with at least two fastening buckles, the fastening buckles being mated with the engaging troughs of the annular outer ring of the nut.

2. The faucet mounting mechanism as claimed in claim 1, wherein the at least one opening includes a plurality of openings which are equally spaced, and the openings divide the annular inner ring into a plurality of teeth.

3. The faucet mounting mechanism as claimed in claim 1, wherein the fastening seat is provided with at least two elastic engaging buckles, the engaging buckles extend outwardly from an outer wall of the fastening seat to be in the form of a barb, and the nut is provided with chutes corresponding to the engaging buckles for the engaging buckles to slide up and down in the corresponding chutes.

4. The faucet mounting mechanism as claimed in claim 1, wherein a notch passing through a bottom of the fastening seat is formed between two sides of each fastening buckle and the fastening seat, an outer side of each fastening buckle has a protrusion, and one end of the protrusion, adjacent to the nut, has a third inclined surface.

5. The faucet mounting mechanism as claimed in claim 4, wherein the fastening seat is recessed to form a retaining wall corresponding in position to each fastening buckle, and a gap is formed between the retaining wall and the corresponding fastening buckle.

6. The faucet mounting mechanism as claimed in claim 5, wherein a bottom end of each fastening buckle extends beyond a bottom end of the fastening seat, and the retaining wall is flush with the bottom end of the corresponding fastening buckle.

7. The faucet mounting mechanism as claimed in claim 1, wherein a bottom of the faucet body is connected to the pipe joint by means of threads or snap-fit.

\* \* \* \* \*